(12) United States Patent
Persaud

(10) Patent No.: US 9,760,271 B2
(45) Date of Patent: Sep. 12, 2017

(54) CLIENT-SIDE DYNAMIC CONTROL OF VISUALIZATION OF FROZEN REGION IN A DATA TABLE

(71) Applicant: INTERNATIONAL BUSINESS MACHINES CORPORATION, Armonk, NY (US)

(72) Inventor: Vishwa Persaud, Woodbridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 14/444,214

(22) Filed: Jul. 28, 2014

(65) Prior Publication Data
US 2016/0026356 A1    Jan. 28, 2016

(51) Int. Cl.
| | |
|---|---|
| *G06F 17/00* | (2006.01) |
| *G06F 3/0485* | (2013.01) |
| *G06F 17/24* | (2006.01) |
| *G06F 17/21* | (2006.01) |

(52) U.S. Cl.
CPC .......... *G06F 3/0485* (2013.01); *G06F 17/212* (2013.01); *G06F 17/245* (2013.01); *G06F 17/246* (2013.01)

(58) Field of Classification Search
CPC ..... G06F 17/211; G06F 17/245; G06F 17/246
See application file for complete search history.

(56) References Cited

U.S. PATENT DOCUMENTS

| | | | | |
|---|---|---|---|---|
| 7,143,340 | B2 * | 11/2006 | Brid ...................... | G06F 17/247 715/227 |
| 7,216,291 | B2 * | 5/2007 | Kim ...................... | G06F 17/245 715/227 |
| 7,783,966 | B2 * | 8/2010 | Mitsui ................... | G06F 17/246 715/212 |

(Continued)

OTHER PUBLICATIONS

Anonymous, "Check Out the New Google Sheets", Google, support.google.com, Retrieved Jul. 28, 2014, pp. 1-2.

(Continued)

*Primary Examiner* — Stephen Hong
*Assistant Examiner* — Gregory Vaughn
(74) *Attorney, Agent, or Firm* — John R. Pivnichny; Law Office of Jim Boice

(57) ABSTRACT

A method, system, and/or computer program product visualizes tabular data with dynamically-generated frozen regions. A control and coordination mechanism oversees modification of a visualization of a browser-based main data table. A cloning and sizing process recursively traverses regions of the browser-based main data table to selectively clone and size regions of the browser-based main data table to be frozen, wherein the regions of the browser-based main data table to be frozen are selectable from any area of the browser-based main data table. An element insertion and positioning process positions and makes visible each newly cloned frozen region, wherein each newly cloned frozen region overlays a region of the browser-based main data table. A responsiveness process uses event listeners and polling mechanisms to detect actions and changes in a table viewport of a visible portion of the browser-based main data table to trigger regeneration of each newly cloned frozen region.

20 Claims, 16 Drawing Sheets

(56) References Cited

U.S. PATENT DOCUMENTS

| | | | |
|---|---|---|---|
| 8,166,387 B2* | 4/2012 | Morrison | G06F 17/245 |
| | | | 715/205 |
| 8,290,966 B2* | 10/2012 | Vignet | G06F 17/30522 |
| | | | 707/754 |
| 8,533,585 B2* | 9/2013 | Buczek | G06F 17/245 |
| | | | 715/227 |
| 9,251,181 B2* | 2/2016 | Gaur | G06F 17/30292 |
| 2005/0120293 A1 | 6/2005 | Benhase et al. | |
| 2006/0117051 A1 | 6/2006 | Chin | |
| 2009/0144607 A1 | 6/2009 | Chen | |
| 2010/0269031 A1* | 10/2010 | Buczek | G06F 17/246 |
| | | | 715/217 |
| 2011/0289398 A1 | 11/2011 | Chin | |
| 2013/0086464 A1 | 4/2013 | Thangappan | |

OTHER PUBLICATIONS

IBM Corporation, "Analysis Studio", IBM Corporation, Last Updated Nov. 27, 2009, Retrieved Jul. 28, 2014, pp. 1-3.

T. Trenka, "Working With the Grid", The Dojo Foundation, dojotoolkit.org, Retrieved Jul. 28, 2014, pp. 1-4.

J. Craig, M. Cooper, Eds., "Accessible Rich Internet Application (WAI-ARIA) 1.0: 5. The Roles Model", W3C, w3.org, Mar. 20, 2014, pp. 1-85.

* cited by examiner

| GEOGRAPHY | | 2010 POPULATION CHANGE | | | 2011 POPULATION CHANGE | | | 2012 POPULATION CHANGE | | | 2013 POPULATION CHANGE | | | 2014 POPULATION CHANGE | | |
|---|---|---|---|---|---|---|---|---|---|---|---|---|---|---|---|---|
| | | IN | OUT | NET | IN | OUT | NET | IN | OUT | NET | IN | OUT | NET | IN | OUT | NET |
| CANADA | ONTARIO | 999 | 999 | 999 | 999 | 999 | 999 | 999 | 999 | 999 | 999 | 999 | 999 | 999 | 999 | 999 |
| | QUEBEC | 999 | 999 | 999 | 999 | 999 | 999 | 999 | 999 | 999 | 999 | 999 | 999 | 999 | 999 | 999 |
| UNITED STATES | ALABAMA | 999 | 999 | 999 | 999 | 999 | 999 | 999 | 999 | 999 | 999 | 999 | 999 | 999 | 999 | 999 |
| | ALASKA | 999 | 999 | 999 | 999 | 999 | 999 | 999 | 999 | 999 | 999 | 999 | 999 | 999 | 999 | 999 |
| | ARIZONA | 999 | 999 | 999 | 999 | 999 | 999 | 999 | 999 | 999 | 999 | 999 | 999 | 999 | 999 | 999 |
| | CALIFORNIA | 999 | 999 | 999 | 999 | 999 | 999 | 999 | 999 | 999 | 999 | 999 | 999 | 999 | 999 | 999 |
| | COLORADO | 999 | 999 | 999 | 999 | 999 | 999 | 999 | 999 | 999 | 999 | 999 | 999 | 999 | 999 | 999 |
| | CONNECTICUT | 999 | 999 | 999 | 999 | 999 | 999 | 999 | 999 | 999 | 999 | 999 | 999 | 999 | 999 | 999 |
| | DELAWARE | 999 | 999 | 999 | 999 | 999 | 999 | 999 | 999 | 999 | 999 | 999 | 999 | 999 | 999 | 999 |
| | FLORIDA | 999 | 999 | 999 | 999 | 999 | 999 | 999 | 999 | 999 | 999 | 999 | 999 | 999 | 999 | 999 |
| | GEORGIA | 999 | 999 | 999 | 999 | 999 | 999 | 999 | 999 | 999 | 999 | 999 | 999 | 999 | 999 | 999 |
| | HAWAII | 999 | 999 | 999 | 999 | 999 | 999 | 999 | 999 | 999 | 999 | 999 | 999 | 999 | 999 | 999 |
| | IDAHO | 999 | 999 | 999 | 999 | 999 | 999 | 999 | 999 | 999 | 999 | 999 | 999 | 999 | 999 | 999 |
| | ILLINOIS | 999 | 999 | 999 | 999 | 999 | 999 | 999 | 999 | 999 | 999 | 999 | 999 | 999 | 999 | 999 |
| | INDIANA | 999 | 999 | 999 | 999 | 999 | 999 | 999 | 999 | 999 | 999 | 999 | 999 | 999 | 999 | 999 |
| | IOWA | 999 | 999 | 999 | 999 | 999 | 999 | 999 | 999 | 999 | 999 | 999 | 999 | 999 | 999 | 999 |

| GEOGRAPHY | | 2010 POPULATION CHANGE | | | 2011 POPULATION CHANGE | | | 2012 POPULATION CHANGE | | | 2013 POPULATION CHANGE | | | 2014 POPULATION CHANGE | | |
|---|---|---|---|---|---|---|---|---|---|---|---|---|---|---|---|---|
| | | IN | OUT | NET | IN | OUT | NET | IN | OUT | NET | IN | OUT | NET | IN | OUT | NET |
| CANADA | ONTARIO | 999 | 999 | 999 | 999 | 999 | 999 | 999 | 999 | 999 | 999 | 999 | 999 | 999 | 999 | 999 |
| | QUEBEC | 999 | 999 | 999 | 999 | 999 | 999 | 999 | 999 | 999 | 999 | 999 | 999 | 999 | 999 | 999 |
| UNITED STATES | ALABAMA | 999 | 999 | 999 | 999 | 999 | 999 | 999 | 999 | 999 | 999 | 999 | 999 | 999 | 999 | 999 |
| | ALASKA | 999 | 999 | 999 | 999 | 999 | 999 | 999 | 999 | 999 | 999 | 999 | 999 | 999 | 999 | 999 |
| | ARIZONA | 999 | 999 | 999 | 999 | 999 | 999 | 999 | 999 | 999 | 999 | 999 | 999 | 999 | 999 | 999 |
| | CALIFORNIA | 999 | 999 | 999 | 999 | 999 | 999 | 999 | 999 | 999 | 999 | 999 | 999 | 999 | 999 | 999 |
| | COLORADO | 999 | 999 | 999 | 999 | 999 | 999 | 999 | 999 | 999 | 999 | 999 | 999 | 999 | 999 | 999 |
| | CONNECTICUT | 999 | 999 | 999 | 999 | 999 | 999 | 999 | 999 | 999 | 999 | 999 | 999 | 999 | 999 | 999 |
| | DELAWARE | 999 | 999 | 999 | 999 | 999 | 999 | 999 | 999 | 999 | 999 | 999 | 999 | 999 | 999 | 999 |
| | FLORIDA | 999 | 999 | 999 | 999 | 999 | 999 | 999 | 999 | 999 | 999 | 999 | 999 | 999 | 999 | 999 |
| | GEORGIA | 999 | 999 | 999 | 999 | 999 | 999 | 999 | 999 | 999 | 999 | 999 | 999 | 999 | 999 | 999 |
| | HAWAII | 999 | 999 | 999 | 999 | 999 | 999 | 999 | 999 | 999 | 999 | 999 | 999 | 999 | 999 | 999 |
| | IDAHO | 999 | 999 | 999 | 999 | 999 | 999 | 999 | 999 | 999 | 999 | 999 | 999 | 999 | 999 | 999 |
| | ILLINOIS | 999 | 999 | 999 | 999 | 999 | 999 | 999 | 999 | 999 | 999 | 999 | 999 | 999 | 999 | 999 |
| | INDIANA | 999 | 999 | 999 | 999 | 999 | 999 | 999 | 999 | 999 | 999 | 999 | 999 | 999 | 999 | 999 |
| | IOWA | 999 | 999 | 999 | 999 | 999 | 999 | 999 | 999 | 999 | 999 | 999 | 999 | 999 | 999 | 999 |

FIG. 3

| GEOGRAPHY | | 2010 POPULATION CHANGE | | | 2011 POPULATION CHANGE | | |
|---|---|---|---|---|---|---|---|
| | | IN | OUT | NET | IN | OUT | NET |
| CANADA | ONTARIO | 999 | 999 | 999 | 999 | 999 | 999 |
| | QUEBEC | 999 | 999 | 999 | 999 | 999 | 999 |
| UNITED STATES | ALABAMA | 999 | 999 | 999 | 999 | 999 | 999 |
| | ALASKA | 999 | 999 | 999 | 999 | 999 | 999 |
| | ARIZONA | 999 | 999 | 999 | 999 | 999 | 999 |
| | CALIFORNIA | 999 | 999 | 999 | 999 | 999 | 999 |
| | COLORADO | 999 | 999 | 999 | 999 | 999 | 999 |
| | CONNECTICUT | 999 | 999 | 999 | 999 | 999 | 999 |
| | DELAWARE | 999 | 999 | 999 | 999 | 999 | 999 |
| | FLORIDA | 999 | 999 | 999 | 999 | 999 | 999 |

FIG. 4

| 999 | 999 | 999 | 999 | 999 | 999 | 999 | 999 | 999 |
|---|---|---|---|---|---|---|---|---|
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |
| 999 | 999 | 999 | 999 | 999 | 999 | 999 | 999 | 999 |

FIG. 5

| GEOGRAPHY | | 2010 POPULATION CHANGE | | | 2011 POPULATION CHANGE | | | 2012 POPULATION CHANGE | | | 2013 POPULATION CHANGE | | | 2014 POPULATION CHANGE | | |
|---|---|---|---|---|---|---|---|---|---|---|---|---|---|---|---|---|
| | | IN | OUT | NET | IN | OUT | NET | IN | OUT | NET | IN | OUT | NET | IN | OUT | NET |
| CANADA | ONTARIO | 999 | 999 | 999 | 999 | 999 | 999 | 999 | 999 | 999 | 999 | 999 | 999 | 999 | 999 | 999 |
| | QUEBEC | 999 | 999 | 999 | 999 | 999 | 999 | 999 | 999 | 999 | 999 | 999 | 999 | 999 | 999 | 999 |
| UNITED STATES | ALABAMA | 999 | 999 | 999 | 999 | 999 | 999 | 999 | 999 | 999 | 999 | 999 | 999 | 999 | 999 | 999 |
| | ALASKA | 999 | 999 | 999 | 999 | 999 | 999 | 999 | 999 | 999 | 999 | 999 | 999 | 999 | 999 | 999 |
| | ARIZONA | 999 | 999 | 999 | 999 | 999 | 999 | 999 | 999 | 999 | 999 | 999 | 999 | 999 | 999 | 999 |
| | CALIFORNIA | 999 | 999 | 999 | 999 | 999 | 999 | 999 | 999 | 999 | 999 | 999 | 999 | 999 | 999 | 999 |
| | COLORADO | 999 | 999 | 999 | 999 | 999 | 999 | 999 | 999 | 999 | 999 | 999 | 999 | 999 | 999 | 999 |
| | CONNECTICUT | 999 | 999 | 999 | 999 | 999 | 999 | 999 | 999 | 999 | 999 | 999 | 999 | 999 | 999 | 999 |
| | DELAWARE | 999 | 999 | 999 | 999 | 999 | 999 | 999 | 999 | 999 | 999 | 999 | 999 | 999 | 999 | 999 |
| | FLORIDA | 999 | 999 | 999 | 999 | 999 | 999 | 999 | 999 | 999 | 999 | 999 | 999 | 999 | 999 | 999 |
| | GEORGIA | 999 | 999 | 999 | 999 | 999 | 999 | 999 | 999 | 999 | 999 | 999 | 999 | 999 | 999 | 999 |
| | HAWAII | 999 | 999 | 999 | 999 | 999 | 999 | 999 | 999 | 999 | 999 | 999 | 999 | 999 | 999 | 999 |
| | IDAHO | 999 | 999 | 999 | 999 | 999 | 999 | 999 | 999 | 999 | 999 | 999 | 999 | 999 | 999 | 999 |
| | ILLINOIS | 999 | 999 | 999 | 999 | 999 | 999 | 999 | 999 | 999 | 999 | 999 | 999 | 999 | 999 | 999 |
| | INDIANA | 999 | 999 | 999 | 999 | 999 | 999 | 999 | 999 | 999 | 999 | 999 | 999 | 999 | 999 | 999 |
| | IOWA | 999 | 999 | 999 | 999 | 999 | 999 | 999 | 999 | 999 | 999 | 999 | 999 | 999 | 999 | 999 |

FIG. 6

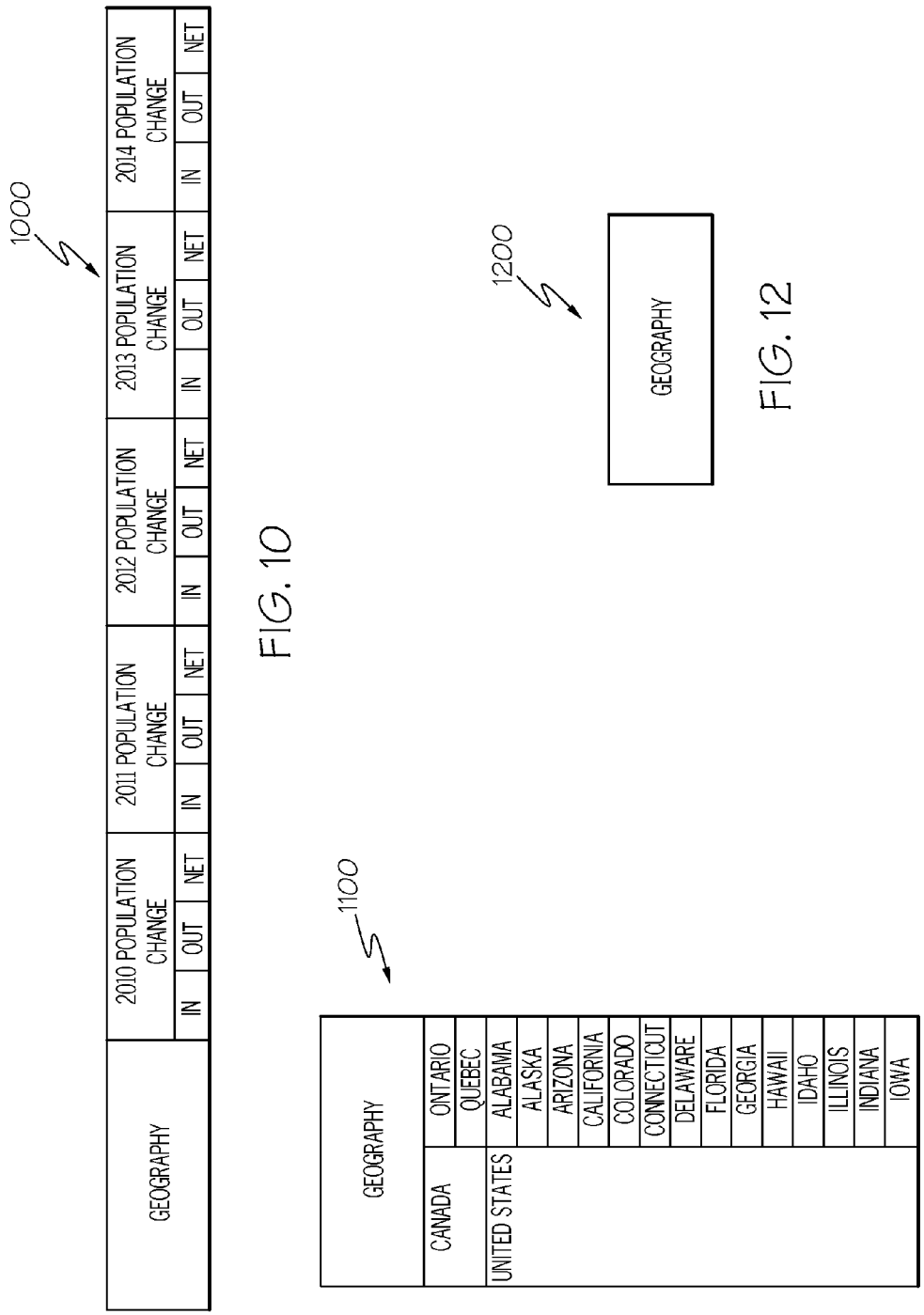

FIG. 13

| GEOGRAPHY | | 2010 POPULATION CHANGE | | | 2011 POPULATION CHANGE | | | 2012 POPULATION CHANGE | | | 2013 POPULATION CHANGE | | | 2014 POPULATION CHANGE | | |
|---|---|---|---|---|---|---|---|---|---|---|---|---|---|---|---|---|
| | | IN | OUT | NET | IN | OUT | NET | IN | OUT | NET | IN | OUT | NET | IN | OUT | NET |
| CANADA | ONTARIO | 999 | 999 | 999 | 999 | 999 | 999 | 999 | 999 | 999 | 999 | 999 | 999 | 999 | 999 | 999 |
| | QUEBEC | 999 | 999 | 999 | 999 | 999 | 999 | 999 | 999 | 999 | 999 | 999 | 999 | 999 | 999 | 999 |
| UNITED STATES | ALABAMA | 999 | 999 | 999 | 999 | 999 | 999 | 999 | 999 | 999 | 999 | 999 | 999 | 999 | 999 | 999 |
| | ALASKA | 999 | 999 | 999 | 999 | 999 | 999 | 999 | 999 | 999 | 999 | 999 | 999 | 999 | 999 | 999 |
| | ARIZONA | 999 | 999 | 999 | 999 | 999 | 999 | 999 | 999 | 999 | 999 | 999 | 999 | 999 | 999 | 999 |
| | CALIFORNIA | 999 | 999 | 999 | 999 | 999 | 999 | 999 | 999 | 999 | 999 | 999 | 999 | 999 | 999 | 999 |
| | COLORADO | 999 | 999 | 999 | 999 | 999 | 999 | 999 | 999 | 999 | 999 | 999 | 999 | 999 | 999 | 999 |
| | CONNECTICUT | 999 | 999 | 999 | 999 | 999 | 999 | 999 | 999 | 999 | 999 | 999 | 999 | 999 | 999 | 999 |
| | FLORIDA | 999 | 999 | 999 | 999 | 999 | 999 | 999 | 999 | 999 | 999 | 999 | 999 | 999 | 999 | 999 |
| | GEORGIA | 999 | 999 | 999 | 999 | 999 | 999 | 999 | 999 | 999 | 999 | 999 | 999 | 999 | 999 | 999 |
| | HAWAII | 999 | 999 | 999 | 999 | 999 | 999 | 999 | 999 | 999 | 999 | 999 | 999 | 999 | 999 | 999 |
| | IDAHO | 999 | 999 | 999 | 999 | 999 | 999 | 999 | 999 | 999 | 999 | 999 | 999 | 999 | 999 | 999 |
| | ILLINOIS | 999 | 999 | 999 | 999 | 999 | 999 | 999 | 999 | 999 | 999 | 999 | 999 | 999 | 999 | 999 |
| | INDIANA | 999 | 999 | 999 | 999 | 999 | 999 | 999 | 999 | 999 | 999 | 999 | 999 | 999 | 999 | 999 |
| | IOWA | 999 | 999 | 999 | 999 | 999 | 999 | 999 | 999 | 999 | 999 | 999 | 999 | 999 | 999 | 999 |

| GEOGRAPHY | | POPULATION CHANGE | | 2012 POPULATION CHANGE | | | 2013 POPULATION CHANGE | | | 2014 POPULATION CHANGE | | |
|---|---|---|---|---|---|---|---|---|---|---|---|---|
| | | OUT | NET | IN | OUT | NET | IN | OUT | NET | IN | OUT | NET |
| CANADA | | 999 | 999 | 999 | 999 | 999 | 999 | 999 | 999 | 999 | 999 | 999 |
| UNITED STATES | ALABAMA | 999 | 999 | 999 | 999 | 999 | 999 | 999 | 999 | 999 | 999 | 999 |
| | ALASKA | 999 | 999 | 999 | 999 | 999 | 999 | 999 | 999 | 999 | 999 | 999 |
| | ARIZONA | 999 | 999 | 999 | 999 | 999 | 999 | 999 | 999 | 999 | 999 | 999 |
| | CALIFORNIA | 999 | 999 | 999 | 999 | 999 | 999 | 999 | 999 | 999 | 999 | 999 |
| | COLORADO | 999 | 999 | 999 | 999 | 999 | 999 | 999 | 999 | 999 | 999 | 999 |
| | CONNECTICUT | 999 | 999 | 999 | 999 | 999 | 999 | 999 | 999 | 999 | 999 | 999 |
| | DELAWARE | 999 | 999 | 999 | 999 | 999 | 999 | 999 | 999 | 999 | 999 | 999 |
| | FLORIDA | 999 | 999 | 999 | 999 | 999 | 999 | 999 | 999 | 999 | 999 | 999 |

| GEOGRAPHY | | | 2010 POPULATION CHANGE | | | 2011 POPULATION CHANGE | | | 2012 POPULATION CHANGE | | | 2013 POPULATION CHANGE | | | 2014 POPULATION CHANGE | | |
|---|---|---|---|---|---|---|---|---|---|---|---|---|---|---|---|---|---|
| | | | IN | OUT | NET | IN | OUT | NET | IN | OUT | NET | IN | OUT | NET | IN | OUT | NET |
| CANADA | ONTARIO | | 999 | 999 | 999 | 999 | 999 | 999 | 999 | 999 | 999 | 999 | 999 | 999 | 999 | 999 | 999 |
| | QUEBEC | | 999 | 999 | 999 | 999 | 999 | 999 | 999 | 999 | 999 | 999 | 999 | 999 | 999 | 999 | 999 |
| UNITED STATES | ALABAMA | | 999 | 999 | 999 | 999 | 999 | 999 | 999 | 999 | 999 | 999 | 999 | 999 | 999 | 999 | 999 |
| | ALASKA | | 999 | 999 | 999 | 999 | 999 | 999 | 999 | 999 | 999 | 999 | 999 | 999 | 999 | 999 | 999 |
| | ARIZONA | | 999 | 999 | 999 | 999 | 999 | 999 | 999 | 999 | 999 | 999 | 999 | 999 | 999 | 999 | 999 |
| | CALIFORNIA | | 999 | 999 | 999 | 999 | 999 | 999 | 999 | 999 | 999 | 999 | 999 | 999 | 999 | 999 | 999 |
| | COLORADO | | 999 | 999 | 999 | 999 | 999 | 999 | 999 | 999 | 999 | 999 | 999 | 999 | 999 | 999 | 999 |
| | CONNECTICUT | | 999 | 999 | 999 | 999 | 999 | 999 | 999 | 999 | 999 | 999 | 999 | 999 | 999 | 999 | 999 |
| | DELAWARE | | 999 | 999 | 999 | 999 | 999 | 999 | 999 | 999 | 999 | 999 | 999 | 999 | 999 | 999 | 999 |
| | FLORIDA | | 999 | 999 | 999 | 999 | 999 | 999 | 999 | 999 | 999 | 999 | 999 | 999 | 999 | 999 | 999 |
| | GEORGIA | | 999 | 999 | 999 | 999 | 999 | 999 | 999 | 999 | 999 | 999 | 999 | 999 | 999 | 999 | 999 |
| | HAWAII | | 999 | 999 | 999 | 999 | 999 | 999 | 999 | 999 | 999 | 999 | 999 | 999 | 999 | 999 | 999 |
| | IDAHO | | 999 | 999 | 999 | 999 | 999 | 999 | 999 | 999 | 999 | 999 | 999 | 999 | 999 | 999 | 999 |
| | ILLINOIS | | 999 | 999 | 999 | 999 | 999 | 999 | 999 | 999 | 999 | 999 | 999 | 999 | 999 | 999 | 999 |
| | INDIANA | | 999 | 999 | 999 | 999 | 999 | 999 | 999 | 999 | 999 | 999 | 999 | 999 | 999 | 999 | 999 |
| | IOWA | | 999 | 999 | 999 | 999 | 999 | 999 | 999 | 999 | 999 | 999 | 999 | 999 | 999 | 999 | 999 |

| GEOGRAPHY | | | 2010 POPULATION CHANGE | | | 2011 POPULATION CHANGE | | | 2012 POPULATION CHANGE | | | 2013 POPULATION CHANGE | | 2014 POPULATION CHANGE | |
|---|---|---|---|---|---|---|---|---|---|---|---|---|---|---|---|
| | | | IN | OUT | NET | IN | OUT | NET | IN | OUT | NET | IN | OUT | | |
| CANADA | | | 999 | 999 | 999 | 999 | 999 | 999 | 999 | 999 | 999 | 999 | 999 | 999 | 999 |
| UNITED STATES | ALABAMA | | 999 | 999 | 999 | 999 | 999 | 999 | 999 | 999 | 999 | 999 | 999 | 999 | 999 |
| | ALASKA | | 999 | 999 | 999 | 999 | 999 | 999 | 999 | 999 | 999 | 999 | 999 | 999 | 999 |
| | ARIZONA | | 999 | 999 | 999 | 999 | 999 | 999 | 999 | 999 | 999 | 999 | 999 | 999 | 999 |
| | CALIFORNIA | | 999 | 999 | 999 | 999 | 999 | 999 | 999 | 999 | 999 | 999 | 999 | 999 | 999 |
| | COLORADO | | 999 | 999 | 999 | 999 | 999 | 999 | 999 | 999 | 999 | 999 | 999 | 999 | 999 |
| | CONNECTICUT | | 999 | 999 | 999 | 999 | 999 | 999 | 999 | 999 | 999 | 999 | 999 | 999 | 999 |
| | DELAWARE | | 999 | 999 | 999 | 999 | 999 | 999 | 999 | 999 | 999 | 999 | 999 | 999 | 999 |
| | FLORIDA | | 999 | 999 | 999 | 999 | 999 | 999 | 999 | 700 | 999 | 999 | 999 | 999 | 999 |
| | HAWAII | | 999 | 999 | 999 | 999 | 999 | 999 | 999 | 999 | 999 | 999 | 999 | 999 | 999 |
| | IDAHO | | 999 | 999 | 999 | 999 | 999 | 999 | 999 | 999 | 999 | 999 | 999 | 999 | 999 |
| | ILLINOIS | | 999 | 999 | 999 | 999 | 999 | 999 | 999 | 999 | 999 | 999 | 999 | 999 | 999 |
| | INDIANA | | 999 | 999 | 999 | 999 | 999 | 999 | 999 | 999 | 999 | 999 | 999 | 999 | 999 |
| | IOWA | | 999 | 999 | 999 | 999 | 999 | 999 | 999 | 999 | 999 | 999 | 999 | 999 | 999 |

FIG. 18

CLIENT-SIDE DYNAMIC CONTROL OF VISUALIZATION OF FROZEN REGION IN A DATA TABLE

BACKGROUND

The present disclosure relates to the field of computers, and specifically to computers that support user interfaces. Still more particularly, the present disclosure relates to controlling the functionality and structure of data tables at the client-side.

With immense growth in big data and analytics, effective information presentation methods are essential. For web applications that present information in tabular form, especially when that information is voluminous or complex, clearly defined and visualized data tables are important for a user's consumption and understanding of the information found in such data tables.

SUMMARY

A method, system, and/or computer program product visualizes tabular data with dynamically-generated frozen regions. A control and coordination mechanism oversees modification of a visualization of a browser-based main data table. A cloning and sizing process recursively traverses regions of the browser-based main data table to selectively clone and size regions of the browser-based main data table to be frozen, wherein the regions of the browser-based main data table to be frozen are selectable from any area of the browser-based main data table. An element insertion and positioning process positions and makes visible each newly cloned frozen region, wherein each newly cloned frozen region overlays a region of the browser-based main data table. A responsiveness process uses event listeners and polling mechanisms to detect actions and changes in a table viewport of a visible portion of the browser-based main data table on a browser-based user interface to trigger regeneration of each newly cloned frozen region.

BRIEF DESCRIPTION OF THE SEVERAL VIEWS OF THE DRAWINGS

FIG. 2 illustrates an exemplary data table whose visualization is to be modified in accordance with one or more embodiments of the present invention;

FIG. 3 depicts an exemplary table viewport of the data table in FIG. 2 with limited visible area;

FIG. 4 illustrates an exemplary table viewport of the data table in FIG. 2 with scrollbars;

FIG. 5 depicts the effect of scrolling the data table in FIG. 2 without frozen regions;

FIG. 6 illustrates visible and unseen portions of a data table in relation to a table viewport;

FIG. 10 illustrates cloned column headers in accordance with one or more embodiments of the present invention;

FIG. 11 depicts cloned row headers in accordance with one or more embodiments of the present invention;

FIG. 12 illustrates an intersection headers table in accordance with one or more embodiments of the present invention;

FIG. 13 depicts "Frozen" row, column and intersection headers overlaying a data table in accordance with one or more embodiments of the present invention;

FIG. 15 depicts "Frozen" regions in a table viewport after scrolling horizontally and vertically in accordance with one or more embodiments of the present invention;

FIG. 16 illustrates an unseen area in a table viewport after scrolling horizontally and vertically in accordance with one or more embodiments of the present invention;

FIG. 18 illustrates unseen content in a table viewport after scrolling vertically in accordance with one or more embodiments of the present invention.

DETAILED DESCRIPTION

Figure 1:
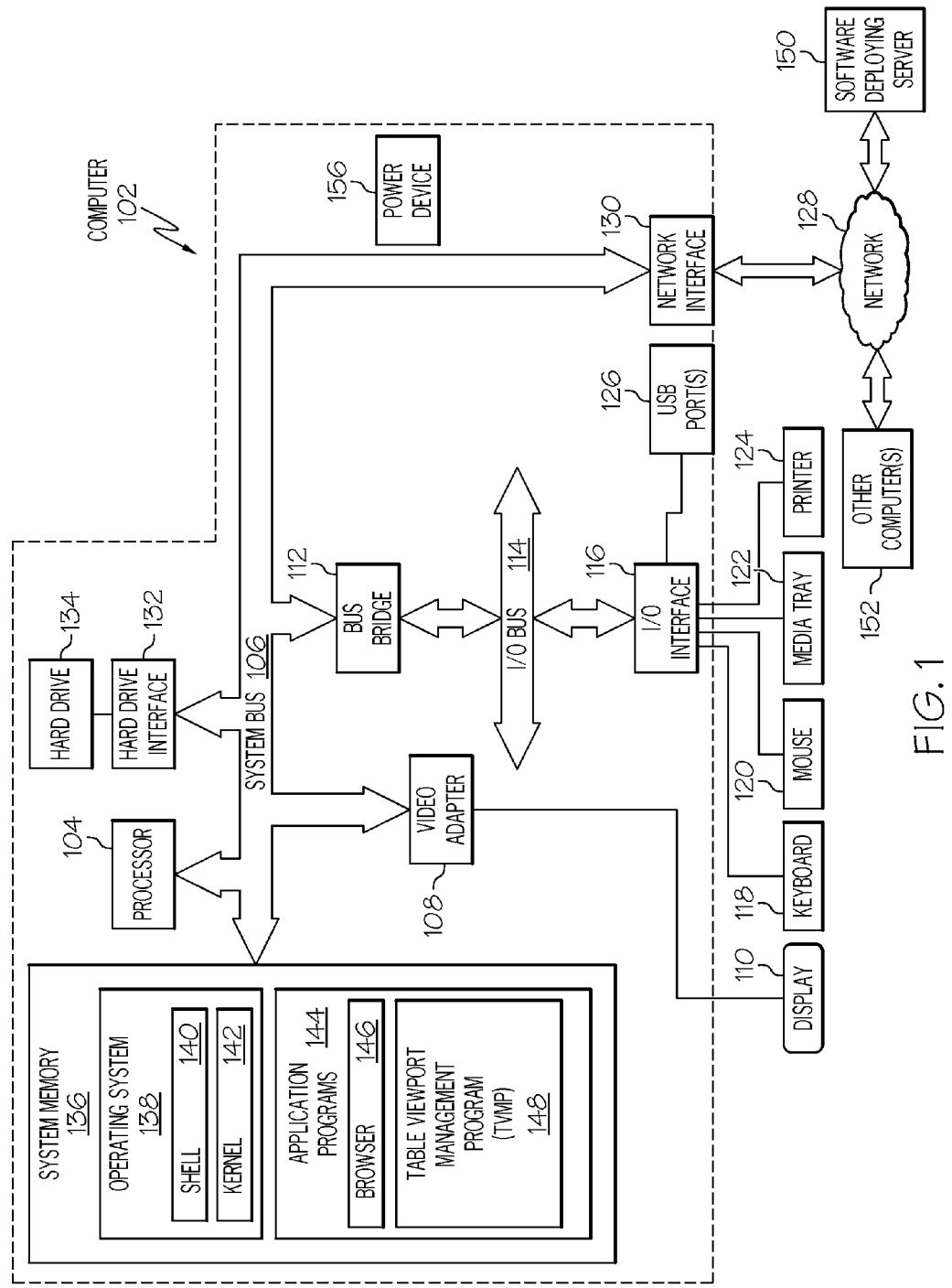
FIG. 1 depicts an exemplary system in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144.

Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Table Viewport Management Program (TVMP) 148. TVMP 148 includes code for implementing the processes described below, including those described in FIGS. 2-19. In one embodiment, computer 102 is able to download TVMP 148 from software deploying server 150, including in an on-demand basis, wherein the code in TVMP 148 is not downloaded until needed for execution. Note further that, in one embodiment of the present invention, software deploying server 150 performs all of the functions associated with the present invention (including execution of TVMP 148), thus freeing computer 102 from having to use its own internal computing resources to execute TVMP 148.

Power is provided to one or more of the components depicted in computer 102 from a power device 156. In various embodiments, power device 156 includes a transformer for lowering/raising incoming voltage (e.g., from a power source—not shown), a converter for converting incoming power from one format into another (i.e., converting alternating current into direct current), power storage devices for storing power (i.e., batteries, capacitors, etc.), etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that in one embodiment, computer 102 functions in the role of providing a browser-based data table, which is described herein, and other computer(s) 152 are browser-enabled client computers that receive and modify the browser-based data table as described herein. In another embodiment of the present invention, one of the other computer(s) 152 functions in the role of providing the browser-based data table, and computer 102 receives and modifies the browser-based data table as described herein.

With reference now to FIG. 2, consider a table with information ("data table") as shown in data table 200. The entire data table 200 may not be visible at once due to various factors. For example, a display may have limited screen space, or the visible table area ("table viewport") may be limited—either unintentionally or intentionally, such as a) when the data table 200 is part of a larger analytics "dashboard" and its visual dimensions must be constrained to accommodate other elements on screen, or b) for aesthetic reasons, like avoiding scrollbars in the main browser window in the case of very wide/tall tables.

Thus, as depicted in FIG. 3, a table view port 300 on data table 200 presents a limited visible area. In order to see areas 302 of the data table 200 outside the table viewport 300, scrolling would be necessary, as shown in the table viewport 400 in FIG. 4. Such scrolling can cause important information to move out of view, such as the row and column headers (depicted the table viewport 500 in FIG. 5 and the table viewport 600 in FIG. 6) and summary/total rows and columns (not depicted). The result of this "lost" information is that users could lose context and meanings of individual data cells. They may in turn need to scroll back and forth repeatedly (e.g. between header and data cells), resulting in decreased productivity and a degraded user experience. The present invention addresses and cures this problem, while avoiding drawbacks of existing methods, using several parts/mechanisms that can be logically grouped as follows:

PART A. Scrollable table viewport with allowance for browser-optimized table optimization;
PART B. Control and coordination;
PART C. Recursive element cloning and sizing;
PART D. Element insertion and positioning; and
PART E. Responsiveness to actions and changes in the viewport.

Details of PART A through PART E are presented below. As a preview/summary of these parts, the following overview is now presented:

Part A—The scrollable table viewport is optimized at the client-side using a call to an application that modifies a display of a data table at the client-side, but without requiring re-coding of the HyperText Markup Language (HTML) code that displays the original data table.

Part B—The control and coordination mechanism is invoked and is provided with various parameters (e.g. the main data table, the table viewport, and regions to freeze). This control and coordination mechanism performs various checks (e.g. ensuring the data table and viewport exist) and, when appropriate, initiates the other processes, such as cloning and sizing.

Part C—The cloning and sizing process recursively traverses portions of the data table, performing element cloning and sizing during recursion.

Part D—The element insertion and positioning process positions and makes visible each newly cloned frozen region, such that it overlays the appropriate region of the main data table.

Part E—The responsiveness process then uses event listeners and polling mechanisms to detect actions and changes in the viewport, such as scrolling and window resizing, which trigger regeneration of the frozen regions.

Note that while a preferred embodiment of the present invention uses JavaScript, the present invention itself is not directly tied to JavaScript, and can utilize equivalent technologies, scripts, languages, architectures, etc.

Note further that the figures presented herein show a common use case involving row and column headers, other regions in a data table can be "frozen" as well (e.g. total/summary rows and/or columns at the bottom or right side of a table). Furthermore, although the figures presented herein show sample tables with only textual content, the present invention does not impose limitations on the table content (e.g. images, videos, combinations of text and images, etc.)

Figure 7:
FIG. 7 depicts a data table with web browser layout optimization in accordance with one or more embodiments of the present invention.
Figure 8:
FIG. 8 illustrates a table viewport with web browser layout optimization in accordance with one or more embodiments of the present invention.
Figure 9:
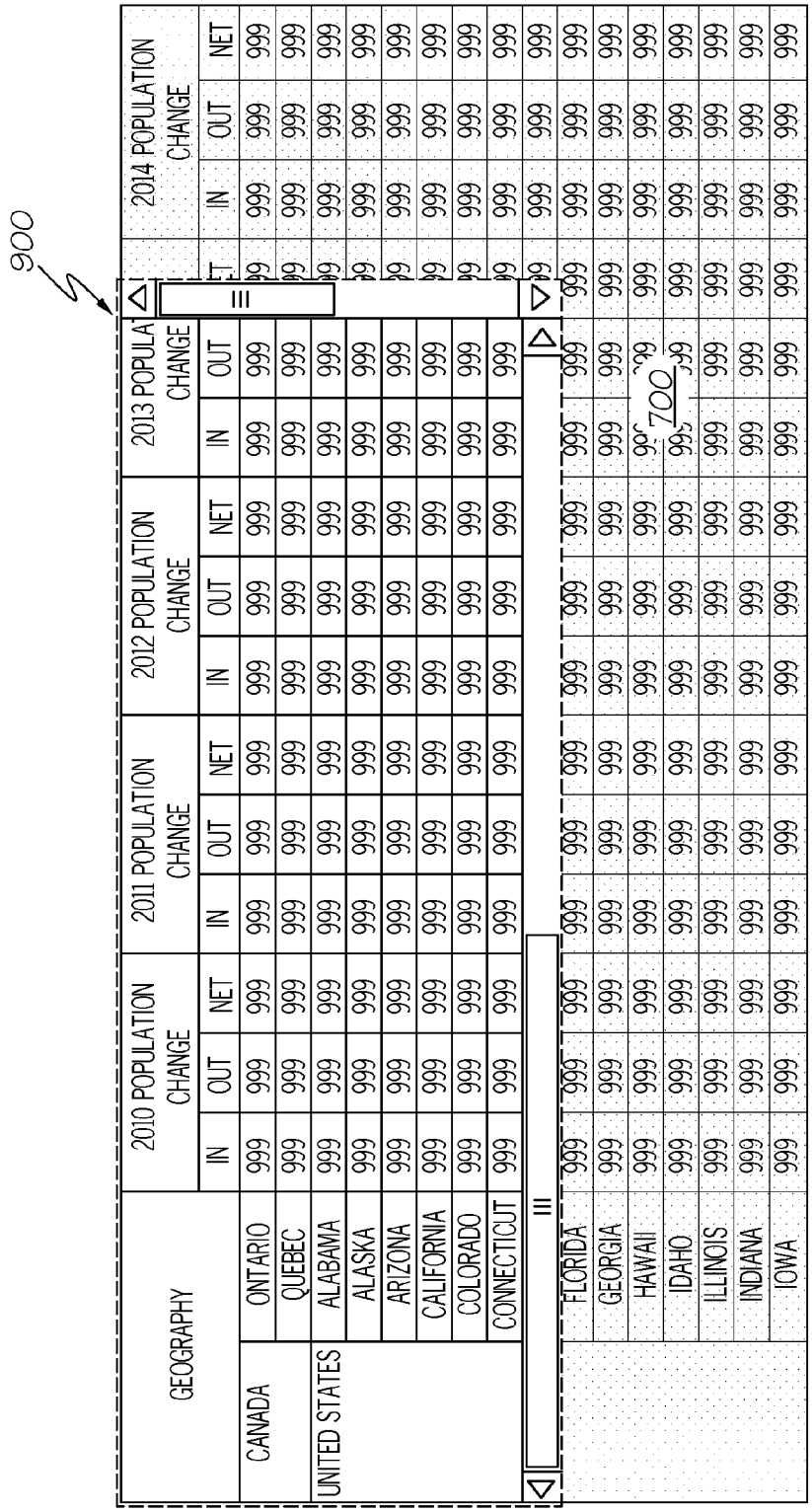
FIG. 9 depicts a table viewport with web browser layout optimization and scrollbars in accordance with one or more embodiments of the present invention.

Part A—Scrollable Table Viewport with Allowance for Browser-Optimized Table Optimization 1. Allow for browser-based optimization. The current invention does not require table or cell dimensions to be forced, predetermined (by pixels, percentages or any other measuring unit) nor calculated using custom-developed means. As such, it can be left to the browser to optimally size the table and its contents, including wrapping content within cells where necessary (see the data table 700 in FIG. 7 compared to the data table 200 in FIG. 2). This results in better use of screen space and reduced need for scrolling (see data table 800 in FIG. 8 compared to the data table 200 shown in FIG. 3). If having fixed/predetermined dimensions of particular rows or columns is desirable (e.g. for aesthetic reasons, such as preventing certain headers from wrapping), then that can be done without affecting the functionality of this invention.

2. Set the table viewport to always or automatically show scrollbars. This can be done via several programmatic or declarative mechanisms, such as by setting the viewport's "overflow" style to "auto", or setting both "overflow-x" and "overflow-y" styles. Thus, the depicted table viewport 900 in FIG. 9 serves as the container for the data table 700 and the subsequent frozen regions. The table viewport 900 itself may be one of several HTML elements, though a "DIV" element (i.e., an HTML <DIV> tag used to device a section in the data table 700 and/or the HTML document) is appropriate in this situation.

Part B—Control and Coordination

3. The control and coordination mechanism is invoked and provided with parameters indicating:
   The data table from which one or more regions are to be frozen;
   The table viewport; and
   One or more regions to be frozen, each of which is defined by:
      The number of rows and columns to be frozen;
      The region's location within the table. Such a location could be supplied in several forms, e.g. row and column index values, or the number of rows to skip to arrive at the target row;
      Optional identifier (ID) prefix/suffix strings, which are used during the cloning process to ensure cloned elements do not result in duplicate IDs within the document, which could otherwise pose problems for standards compliance or UI functionality; and
      Scroll synchronization behavior (i.e., whether scrolling should be synchronized with the table viewport horizontally, vertically, both horizontally and vertically, or neither horizontally nor vertically).

4. The control and coordination mechanism performs the following:
   a) Checks input parameters to ensure that:
      i) The data table and table viewport actually exist in the HTML document object model (DOM) and are visible, otherwise the frozen regions are unnecessary;
      ii) The data table's width and/or height exceeds that of its viewport, to confirm whether it requires scrolling. This check acts as a "short circuit" because if scrolling in not required, then frozen regions are unnecessary and all remaining steps can be bypassed;
      iii) The parameters for each region to be frozen define valid portions of the data table (e.g. it is invalid to freeze a table row if that row doesn't even exist in the data table); and
      iv) The ID prefix/suffix strings were supplied and, if not, default to predetermined or generated strings for each region (e.g. "_rowHeader" as a suffix for IDs of elements cloned from the row header region).

Failures in validation checks can be handled based on the application's needs. This may, for example, involve error messaging to the user, ignoring the failure entirely or re-running this control process at a later time (e.g. using the JavaScript "setTimeout" function), especially for AJAX-based single page applications (SPA) where web page content could be dynamically generated/changed.

b) If the checks described above are successful, then the system will:
      i) Invoke the cloning process for each of the regions to be frozen;
      ii) For each cloned region, invoke the process for "Element insertion and positioning"; and
      iii) Invoke the process for "Responsiveness to actions and changes in the viewport".

Part C—Recursive Element Cloning and Sizing

5. The cloning process recursively clones HTML elements (DOM nodes), skipping nodes that do not need to be cloned (i.e. those which do not need to be "frozen" in a given invocation of the cloning mechanism) and stopping when the desired set of cloned nodes is reached or when the maximum number of rows/columns in the data table is reached.

Each invocation of the cloning process receives parameters indicating:
   The node to be cloned;
   The number of rows left to be cloned;
   The number of columns left to be cloned in the current row;
   The number of rows left to be skipped from cloning; and
   The number of columns left to be skipped from cloning in the current row.

This cloning process performs two types of cloning: "Shallow cloning" and "Deep cloning". "Shallow cloning" clones a node without its children nodes, e.g. in JavaScript by calling the node's cloneNode(false) function. "Deep cloning" clones a node along with its children nodes, e.g. in JavaScript by calling the node's cloneNode(true) function.

During the cloning process:
   a) If the current node is a TABLE node:
      i) Perform a shallow clone. A shallow clone is needed for this type of node because a deep clone would clone all the rows/columns/cells within the TABLE instead of the subset needed for the frozen region;
      ii) Set the WAI-ARIA (Web Accessibility Initiative—Accessible Rich Internet Applications) role equal to "presentation" for the newly-created clone. This is done for accessibility purposes to indicate that the clone is purely presentational without the native semantics and functionality of a standard table;
      iii) Remove the "summary" attribute from the newly-created clone to avoid misinforming assistive technologies (such as screen readers) about the purpose and contents of the clone;
      iv) Adjust DOM IDs on newly-created clones to avoid duplicate IDs (using ID prefix/suffix strings described earlier);

v) Set the clone's height and width to one pixel each, or a similar very small value. This prevents the cloned table from becoming too large. For example, if the main data table was configured with a width of "100%", then a cloned table used for row headers would adopt that 100% width as part of the cloning process and would therefore be too wide. Setting the one-pixel width restricts the cloned table to the minimum size required for its cloned children cells—and those cells will be sized to match their counterpart main data table cells (step 'd' below); and vi) Perform recursion into children nodes by calling this same cloning process and passing it the children nodes of the current node.

b) If the current node is a THEAD or TBODY node:
  i) Perform a shallow clone. A shallow clone is needed for this type of node because a deep clone would clone all the cells within the current node, which may be different from the ones needed for the frozen region;
  ii) Adjust DOM IDs on newly-created clones to avoid duplicate IDs (using ID prefix/suffix strings described earlier); and
  iii) Perform recursion into children nodes by calling this same cloning process and passing it the children nodes of the current node.

c) If the current node is a TR node:
  i) If the number of rows left to skip is greater than zero, then:
    Decrement by one the number of rows left to skip,
  ii) Otherwise:
    Perform a shallow clone;
    Adjust DOM IDs on newly-created clones to avoid duplicate IDs (using ID prefix/suffix strings described earlier);
    Perform recursion into children nodes by calling this same cloning process and passing it the children nodes of the current node; and
    Decrement the number of rows left to be cloned.

d) If the current node is a TH or TD node:
  i) If the number of columns left to skip is greater than zero, then:
    Decrement the number of columns left to skip by the current node's column span ("colspan" attribute), defaulting to "1" if null or not present. For example, if, prior to this step, there were 11 columns to skip in the current row and the current TH or TD node has a column span of "4", then the adjusted columns to skip value would be "7".
  ii) Otherwise:
    Perform a deep clone. A deep clone is used for this type of node to clone all the contents within table cells that are part of the frozen region;
    Decrement the number of columns left to be cloned by the current node's column span ("colspan" attribute), defaulting to "1" if null or not present. For example, if, prior to this step, there were 11 columns left to clone in the current row and the current TH or TD node has a column span of "4", then the adjusted columns to clone value would be "7";
    Adjust DOM IDs on newly-created clones to avoid duplicate IDs (using ID prefix/suffix strings described above). If desirable, IDs of children elements within the newly-cloned TH/TD cell can also be adjusted at this stage;
    Compute and adjust the height and width of the current node to precisely match the source node from which the current node was cloned:
      Set a height variable equal to the height of the source node's bounding rectangle, e.g. via the source node's getBoundingClientRect( ).height property or (getBoundingClientRect( ).bottom—getBoundingClientRect( ).top) for web browsers that do not support getBoundingClientRect( ).height;
      Set a width variable equal to the width of the source node's bounding rectangle, e.g. via the source node's getBoundingClientRect( ).width property or (getBoundingClientRect( ).right—getBoundingClientRectOleft) for web browsers that do not support getBoundingClientRect( ).width;
      At this stage, the height and width variables can be further adjusted, if desired, to account for browser-specific defects (such as browsers with standards-compliance issues), based on which browsers the web page must support. For example, in certain browsers, cell padding and/or border dimensions need to be subtracted from the height variable, while in other browsers, the height must be rounded to a fixed number of decimal places to avoid visual alignment issues;
      After the height is computed, set the cloned node's "height", "minHeight" and "maxHeight" styles all equal to the computed height. This ensures the cloned cell's precise height and prevents any unwanted increase or decrease by the browser, which would negatively affect visual alignment between frozen regions and the main data table; and
      After the width is computed, set the cloned node's "width", "minWidth" and "maxWidth" styles all equal to the computed width. This ensures the cloned cell's precise width and prevents any unwanted increase or decrease by the browser, which would negatively affect visual alignment between frozen regions and the main data table.

e) For other nodes, perform a shallow clone.

The following are sample outputs from the cloning process, using the data table 700 from FIG. 7 as an input:

As depicted in FIG. 10, the cloning process described herein generates column headers 1000.

As depicted in FIG. 11, the cloning process described herein generates row headers 1100, as shown in FIG. 11.

As depicted in FIG. 12, the cloning process described herein is invoked to generate "intersection" headers 1200 (which do not require programmatic scrolling).

Part D—Element Insertion and Positioning

6) For each new frozen table region that is generated:
  i) Create a new "wrapper" element (e.g. DIV) to hold the frozen region. This new wrapper element should be created with no margins, no padding and no scrollbars (e.g. via the "overflow" style, or a combination of "overflow-x" and "overflow-y"). Scrollbars are not necessary because these frozen regions will be programmatically scrolled to synchronize with the main data table's scrolling. Additionally, set the wrapper's "z-index" (its depth relative to other elements) greater than that of the main data table so that it appears above the main data table;

ii) Into this wrapper element, add the frozen table region as a child element;
iii) Insert the wrapper element into the HTML document, as a hidden element and as a child of the table viewport;
iv) Overlay and position the wrapper element based on the region of the data table from which it was frozen:
   When freezing one or more rows from the top of the data table (e.g. column headers), align the top edge of the wrapper inside the top of the table viewport (e.g. by setting its "top" style to "0px");
   When freezing one or more rows from the bottom of the data table (e.g. summary/total rows), align the bottom edge of the wrapper inside the bottom of the table viewport (e.g. by setting its "bottom" style to "0px");
   When freezing one or more columns from the left side of the data table (e.g. row headers), align the left edge of the wrapper inside the left of the table viewport (e.g. by setting its "left" style to "0px"); and
   When freezing one or more columns from the right side of the data table (e.g. summary/total columns), align the right edge of the wrapper inside the right of the table viewport (e.g. by setting its "right" style to "0px"); and
v) Make the wrapper element visible.

Figure 14:
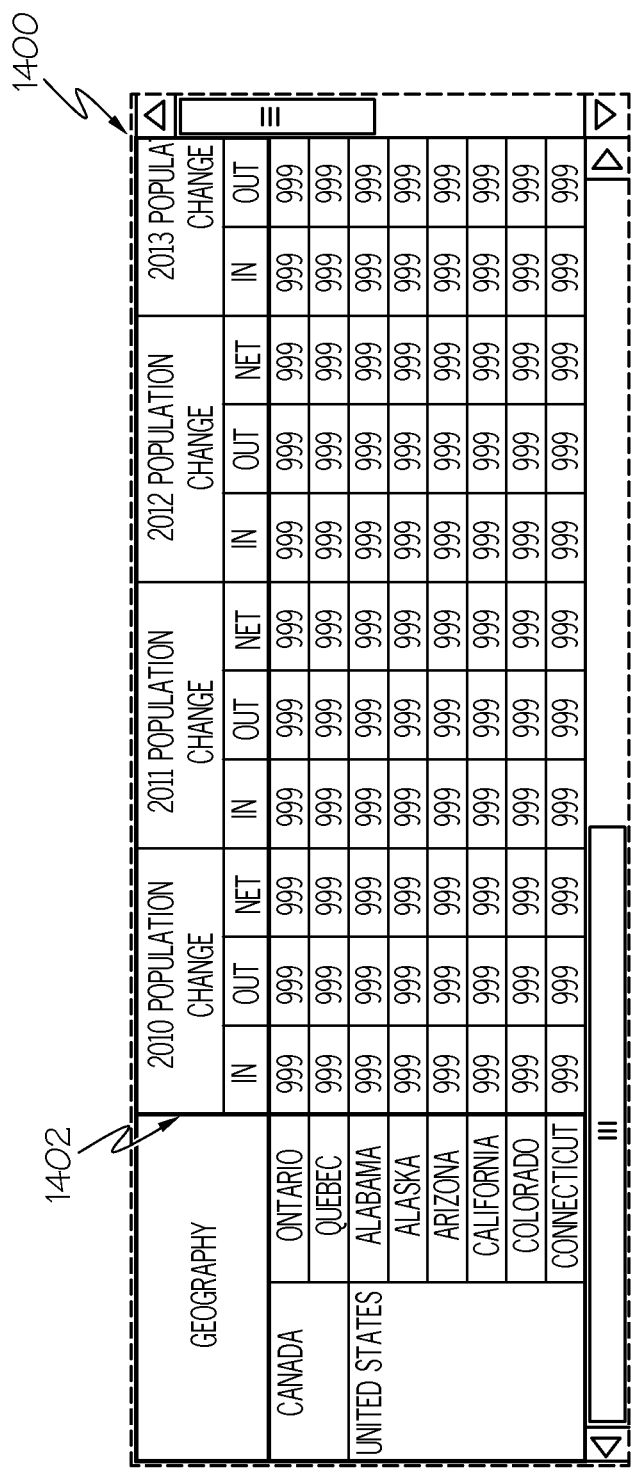
FIG. 14 illustrates "Frozen" regions overlaying a data table (without unseen areas outside the table viewport) in accordance with one or more embodiments of the present invention.

A resulting example with multiple frozen regions is depicted in the table viewport 1300 in FIG. 13 and the table viewport 1400 in FIG. 14. Note that the solid lines (1302 and 1402) highlight the frozen regions on the table viewports 1300/1400 for purposes of illustration, but may or may not be displayed on the actual user interface. Thus, FIG. 13 depicts "Frozen" row, column and intersection headers (bounded by solid lines 1302) overlaying the data table 700 while indicating where the unseen areas from data table 200 are oriented. FIG. 14 illustrates "Frozen" regions (bounded by solid lines 1402) of table viewport 1400 overlaying data table 700 (without unseen areas outside the table viewport 1400).

Part E—Responsiveness to Actions and Changes in the Viewport

7) Add event listeners and a polling mechanism to respond to viewport changes (scrolling, zooming, resizing, etc.):
   i) Attach an event listener for scroll events to the table viewport, with a handler function to respond when those events are triggered. The handler function:
      Retrieves the horizontal scroll position of the table viewport and sets the same horizontal scroll position on frozen regions that are designated to scroll horizontally, such as column headers; and
      Retrieves the vertical scroll position of the table viewport and sets the same vertical scroll position on frozen regions that are designated to scroll vertically, such as row headers. (FIG. 15, FIG. 16, FIG. 17, and FIG. 18 provide examples of the frozen regions scrolled to synchronize with the table viewport's scrolling.)
   ii) Attach an event listener for resize events to the browser window, with a handler function that triggers a re-build of the frozen regions, e.g. by calling the control mechanism described herein.
   iii) Font size and zoom detection:
      Create a new, empty HTML element (e.g. a DIV element);
      To prevent the new element from being visible on screen, its position style is set to "absolute" and visibility style to "hidden";
      To allow the new element to automatically resize during zooming, font size changes, etc., its height and width are set using relative units (using "em" or percentage units, such as "20em", as opposed to absolute pixel units);
      A polling function is created and configured to run at certain time intervals (e.g. every 1000 milliseconds using the JavaScript setTimeout( ) function). The exact interval is at the discretion of the developer, but, for user interface responsiveness, should be no more than a few seconds; and
      That polling function retrieves the size of the element in absolute pixel units. Each invocation of the polling function compares the size to that from the previous invocation. If the sizes are different, then initiate a re-build of the frozen regions.
   iv) A second polling function (again, executed at some interval) checks for the existence of the main data table and table viewport. If either of those elements no longer exists, then a "cleanup" procedure is executed to remove frozen regions from the document, detach event listeners and discontinue execution of polling functions.

Thus, FIG. 15 depicts "Frozen" regions in a table viewport 1500 after scrolling horizontally and vertically.

FIG. 16 illustrates a table viewport 1600 after scrolling horizontally and vertically against an unseen backdrop of data table 700.

Figure 17:
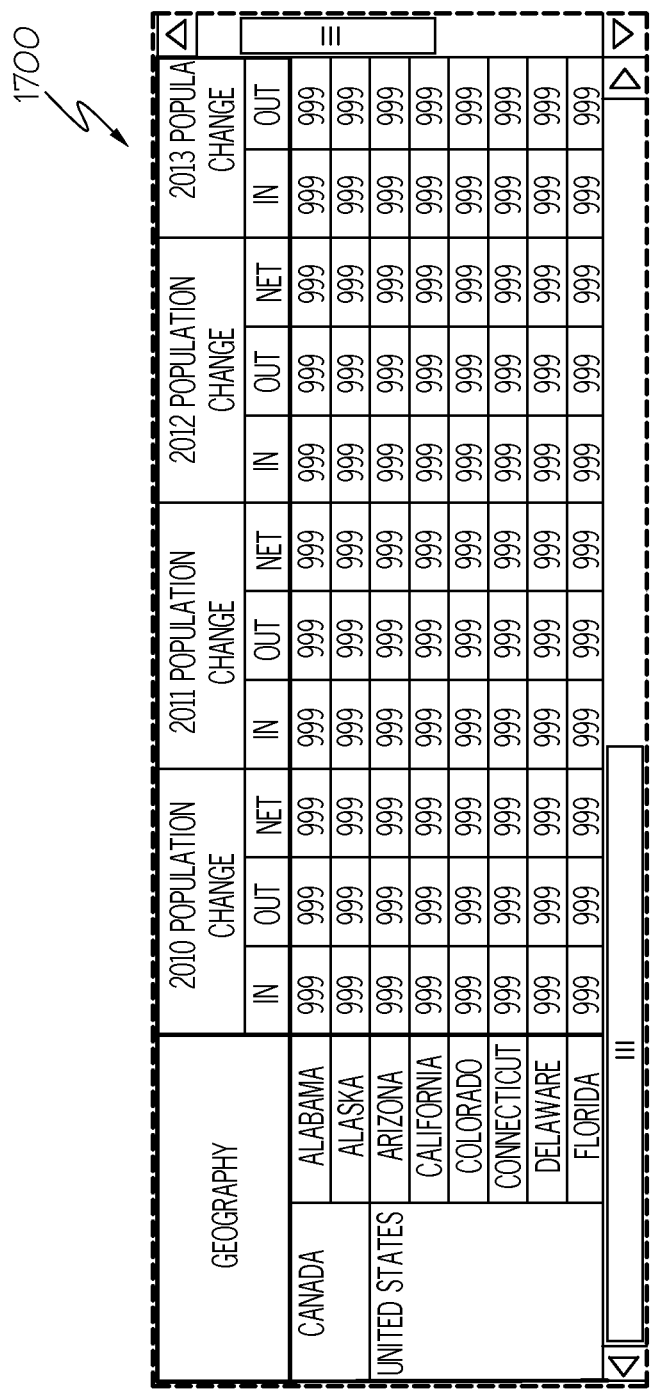
FIG. 17 depicts "Frozen" regions in a table viewport after scrolling vertically in accordance with one or more embodiments of the present invention.

FIG. 17 depicts "Frozen" regions in a table viewport 1700 after scrolling vertically.

FIG. 18 illustrates unseen content in a table viewport 1800 after scrolling vertically against a (hidden) backdrop of a data table 700.

Figure 19:
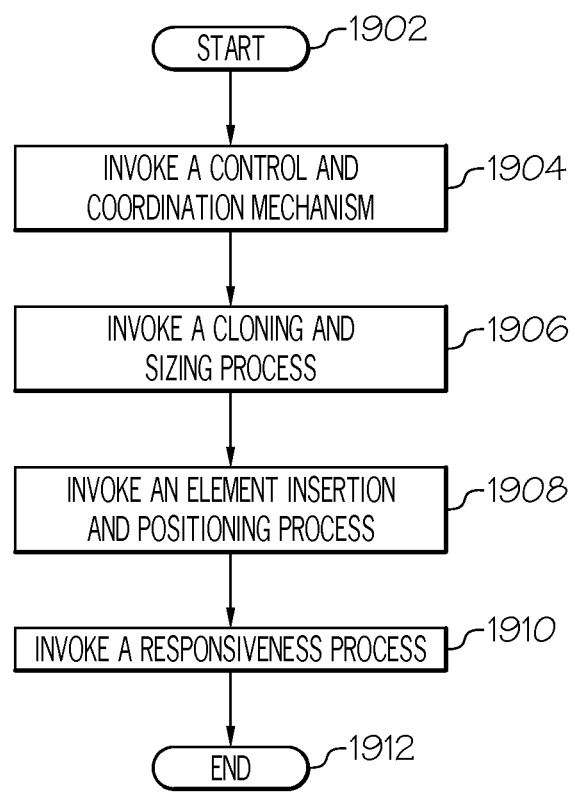
FIG. 19 is a high level flow-chart of one or more operations performed by one or more processors for dynamically adjusting a visualization of a table viewport at a client-side.

FIG. 19 is a high level flow-chart of one or more operations performed by one or more processors for dynamically adjusting a table viewport at a client-side, including visualizing tabular data with dynamically-generated frozen regions.

After initiator block 1902, a control and coordination mechanism is invoked to oversee a modification of a browser-based main data table (block 1904). In one or more embodiments, this control and coordination mechanism is an application to control cloning, sizing, element insertion and positioning, etc. to dynamically generate and visualize frozen regions on a table, as described herein.

As described in block 1906, a cloning and sizing process is then invoked. This cloning and sizing process recursively traverses regions of the browser-based main data table to selectively clone and size regions of the browser-based main data table to be frozen. A frozen portion of the browser-based main data table remains in a fixed position on a browser-based user interface while other cloned regions of the browser-based main data table are being scrolled. The recursive traversal of regions of the browser-based main data table selects regions to be frozen in an unrestricted manner. That is, the regions of the browser-based main data table to be frozen are selectable from any area of the browser-based main data table, not just the top or side. Rather, any region (set of cells) in the browser-based main table, including cell groups in the top, bottom, left side, right side, and even interior of the browser-based main table may be frozen in accordance with one or more embodiments of the present invention.

As described in block 1908, invoking an element insertion and positioning process positions and makes visible each newly cloned frozen region, wherein each newly cloned frozen region overlays a region of the browser-based main data table. That is, a cloned region of the browser-based main data table is overlaid on top of the original browser-based main data table. Thus, when the original browser-based main data table is scrolled (i.e., scrolling tabs are moved to cause the view of the browser-based main data table to move up/down and/or left/right), placement of the cloned region is able to remain fixed on the user interface, while contents of the frozen cloned region are still scrollable (in the unfrozen direction). That is, if the frozen section is frozen vertically, it is still scrollable horizontally, and vice versa, without requiring the user to scroll the frozen cloned region. Rather, the scrolling of the frozen cloned region dynamically occurs in response to the main data table being scrolled.

As described in block 1910, invoking a responsiveness process uses event listeners and polling mechanisms to detect actions and changes in a table viewport of a visible portion of the browser-based main data table on a browser-based user interface. These actions and changes in the table viewport of the visible portion of the browser-based main data table thus trigger regeneration of said each newly cloned frozen region. Note that in one or more embodiments of the present invention, the control and coordination mechanism, cloning and sizing process, element insertion and positioning process, and responsiveness process are initiated by a call to an application that modifies a visualization of the browser-based main data table.

The flow-chart of FIG. 19 ends at terminator block 1912.

In one embodiment of the present invention, parameters for invoking the control and coordination mechanism are provided. These parameters include, but are not limited to, the browser-based main data table, the table viewport, and the regions of the browser-based main data table to be frozen.

In one embodiment of the present invention, the responsiveness process is invoked to detect scrolling and window resizing of the browser-based main data table. This detection allows the system to adjust the frozen region(s) according to the scrolling/resizing of the browser-based main data table, and/or in response to the size of the browser window itself changing.

In one embodiment of the present invention, a visualization of the browser-based main data table is modified without re-coding of the HyperText Markup Language (HTML) code that displays the browser-based main data table. Thus, the visualization of the browser-based main data table is modified solely by initiating the call to the application that modifies a display of the browser-based main data table at the client-side.

In one embodiment of the present invention, the browser-based main data table is post-processed to dynamically generate the regions of the browser-based main data table to be frozen. That is, a selection of a quantity of regions and dimensions of regions for freezing within the browser-based main data table are decided upon and generated entirely at run-time on a client device that receives the browser-based main data table from a web server.

In one embodiment of the present invention, in response to cell sizes of cells in the browser-based main data table changing, a cell size of the frozen regions is adjusted to match changed cell sizes of cells in the browser-based main data table.

In one embodiment of the present invention, all perimeter cells around a perimeter of the browser-based main data table are frozen. That is, a top row of cells, a bottom row of cells, a left column of cells, and a right column of cells in the browser-based main data table are all frozen.

As described herein, in one or more embodiments the present invention uses post-processing of the main data table (on the client-side) to dynamically generate frozen regions. This post-processing provides several advantages over the prior art.

First and with regards to the frozen regions themselves, the quantity of regions and dimensions of regions (e.g. a 1×10 section at the bottom edge, or a 3×10 section, etc.) can be both decided upon and generated entirely at run-time on the client-side. This can be done programmatically (e.g. via an application's JavaScript) and can even be exposed to end-users, such that users can pick which regions to freeze/un-freeze at-will.

Second, once frozen regions are active, they can be changed and/or removed, as well new regions added, at run-time (again, either programmatically without user intervention and/or exposed to end-users).

Third, designers/developers are free to predefine which regions need to be frozen (at development time), or they can let users choose at run-time, or a combination of the two.

Note that it is this post-processing ability that allows existing tables to be retrofitted without changing the contents of those tables and without having to re-code those tables. Therefore, a developer can invoke the present invention and point it at a standard existing HTML table and say (for example) "freeze a, b and c" regions/cells in the table.

Thus, as described herein, the present invention aids in information consumption and traversal using dynamic and responsive frozen table regions—from small, simple tables to large, complex ones and everything in between. The present invention does so while preserving browser-optimized sizing and layout, and overcoming numerous drawbacks of existing methods.

Advantageously, end-users of a website benefit with richer functionality, along with improved usability and productivity, which in turn improves their perception of the website. Software developers and designers benefit, too. With the presently presented novel approach involving client-side post-processing, recursive cloning, precision sizing and positioning, event listeners and polling mechanisms, the present invention provides its benefits without requiring browser plug-ins, without needing to modify or re-code standard HTML tables and without imposing specific user interface styles, widgets, etc. Developers and designers can therefore deliver their products with richer functionality quicker and cheaper because they can design and build tables using standard web technologies and can even retrofit existing tables with frozen regions.

Thus, in one or more embodiments the present invention uses fixed/stationary regions to help users retain context and relationships among table cells (e.g. header and data cells) as they interact with and navigate a table (e.g. via scrolling). Such "frozen" regions can include cells that span multiple rows and/or columns and are not limited to row/column headers. Examples of frozen regions include, but are not limited to: a) Row and column headers; and b) Row and column summaries, such as a "total" column or a "summary"/"footer" row within the bottom portion of a table.

The present invention optimizes table size and layout (e.g. row and column dimensions) to utilize available display areas and avoid wasted space within the table.

The present invention is responsive to changes in the browser viewport (changes to zoom level, browser window size, browser and operating system font size, and device orientation), and provides a visualization of a data table in a way that users can access across major web browsers while (a) not requiring browser plug-ins, and (b) not needing specific user action, such as manually sizing table rows/columns or installing/configuring/updating plug-ins.

As described herein, the present invention dynamically generates "frozen" table regions, while preserving browser-optimized table size and layout and being responsive to changes in the browser viewport. It does so by post-processing the browser-optimized data table and recursively cloning portions of the data table to generate new frozen table areas, which are precisely sized and visually overlaid over the main data table. It then uses a combination of event listeners and polling mechanisms to respond to viewport changes (scrolling, zooming, resizing, etc.). The frozen regions are dynamically scrolled to synchronize with scrolling of the main data table and viewport changes are detected, triggering dynamic regeneration of frozen regions entirely on the client-side, removing the need for a server round-trip. Throughout that process, the main data table is not modified, so its style and contents remain unchanged, while the frozen regions adopt those same styles and contents from their corresponding main data table cells. And because the main data table is not changed, it retains its web standards and regulatory compliance characteristics (e.g. accessibility). This results in dynamic and responsive frozen regions with optimized table layout, while overcoming aforementioned drawbacks of existing known solutions.

Benefits to a website's users include richer functionality, along with improved usability and productivity in traversing and understanding tabular content—especially when dealing with large or complex tables, as is commonplace in business intelligence and analytics applications. Software developers and designers can deliver their products with richer functionality quicker and cheaper because they can design and build tables using standard web technologies without the need to learn new technologies (e.g. browser plug-ins, new languages/syntax/conventions) and they can even retrofit previously-developed tables with frozen regions.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for visualizing tabular data with dynamically-generated frozen regions, the method comprising:

invoking, by one or more processors, a control and coordination mechanism to oversee a modification of a visualization of a browser-based main data table, wherein the browser-based main data table is generated by HyperText Markup Language (HTML) code;

invoking, by one or more processors, a cloning and sizing process, wherein the cloning and sizing process recursively traverses regions of the browser-based main data table to selectively clone and size regions of the browser-based main data table to be frozen, wherein a placement of a frozen portion of the browser-based main data table remains in a fixed position on a browser-based user interface while other cloned regions of the browser-based main data table are being scrolled, and wherein the regions of the browser-based main data table to be frozen are selectable from any area of the browser-based main data table;

invoking, by one or more processors, an element insertion and positioning process, wherein the element insertion and positioning process positions and makes visible each newly cloned frozen region, wherein said each newly cloned frozen region overlays a region of the browser-based main data table, wherein said element insertion further overlays a first scrollbar over a row of the region and a second scrollbar over a column of the region, and wherein the first scrollbar and the second scrollbar control scrolling through the newly cloned frozen region; and invoking, by one or more processors, a responsiveness process, wherein the responsiveness process uses event listeners and polling mechanisms to detect actions and changes in a table viewport of a visible portion of the browser-based main data table on the browser-based user interface, wherein said actions and changes in the table viewport of the visible portion of the browser-based main data table trigger regeneration of said each newly cloned frozen region, wherein said control and coordination mechanism, said cloning and sizing process, said element insertion and positioning process, and wherein said responsiveness process is initiated by a call to an application that modifies a display of the browser-based main data table on a browser-based user interface at a client-side.

2. The method of claim 1, further comprising:

providing, by one or more processors, parameters for invoking the control and coordination mechanism, wherein the parameters include the browser-based main data table, the table viewport, and the regions of the browser-based main data table to be frozen.

3. The method of claim 1, further comprising:

invoking, by one or more processors, the responsiveness process to detect scrolling and window resizing of the browser-based main data table.

4. The method of claim 1, further comprising:

modifying, by one or more processors, a visualization of the browser-based main data table without re-coding of the HyperText Markup Language (HTML) code that, when executed by a browser, displays the browser-based main data table, wherein the visualization of the browser-based main data table is modified solely by initiating the call to the application that modifies the display of the browser-based main data table on the browser-based user interface at the client-side.

5. The method of claim 1, further comprising:

post-processing, by one or more processors, the browser-based main data table to dynamically generate the regions of the browser-based main data table to be frozen, wherein a selection of a quantity of regions and dimensions of regions for freezing within the browser-based main data table are decided upon and generated entirely at run-time on a client device that receives the browser-based main data table from a web server.

6. The method of claim 1, further comprising:

in response to cell sizes of cells in the browser-based main data table changing, adjusting, by one or more processors, a cell size of the frozen regions to match changed cell sizes of cells in the browser-based main data table.

7. The method of claim 1, further comprising:

freezing, by one or more processors, perimeter cells around a perimeter of the browser-based main data table, wherein said perimeter cells comprise a top row of cells, a bottom row of cells, a left column of cells, and a right column of cells in the browser-based main data table.

8. The method of claim 1, wherein the newly cloned frozen region is a cell that shows a sum of values in a column in the browser-based main data table.

9. The method of claim 1, wherein the newly cloned frozen region includes a top row of cells in the browser-based main data table, a bottom row of cells in the browser-based main data table, a leftmost column of cells in the browser-based main data table, and a rightmost column of cells in the browser-based main data table.

10. The method of claim 1, wherein the frozen portion of the browser-based main data table remains in the fixed vertical scrolling position on a browser-based user interface such that the frozen portion of the browser-based main data table is not scrollable in a vertical direction, and wherein the frozen portion of the browser-based main data table is scrollable in a horizontal direction.

11. The method of claim 1, wherein the frozen portion of the browser-based main data table is purely presentational without any native semantics and functionality of the browser-based main data table.

12. The method of claim 1, further comprising:

performing, by one or more processors, a shallow cloning of one or more nodes in the browser-based main data table, wherein the shallow cloning clones the one or more nodes in the browser-based main data table without cloning any child nodes that depend on the one or more nodes in the browser-based main data table.

13. The method of claim 1, wherein cloned elements in the newly cloned frozen region have identifiers that are not used by any element in the browser-based main data table that is overlaid by the newly cloned frozen region.

14. A computer program product for visualizing tabular data with dynamically-generated frozen regions, the computer program product comprising a computer readable storage medium having program code embodied therewith, wherein the computer readable storage medium is not a transitory signal per se, and wherein the program code is readable and executable by a processor to perform a method comprising:

invoking a control and coordination mechanism to oversee a modification of a visualization of a browser-based main data table;

invoking a cloning and sizing process, wherein the cloning and sizing process recursively traverses regions of the browser-based main data table to selectively clone and size regions of the browser-based main data table to be frozen, wherein a placement of a frozen portion of the browser-based main data table remains in a fixed position on a browser-based user interface while other cloned regions of the browser-based main data table are being scrolled, and wherein the regions of the browser-based main data table to be frozen are selectable from any area of the browser-based main data table;

invoking an element insertion and positioning process, wherein the element insertion and positioning process positions and makes visible each newly cloned frozen region, and wherein said each newly cloned frozen region overlays a region of the browser-based main data table; and invoking a responsiveness process, wherein the responsiveness process uses event listeners and polling mechanisms to detect actions and changes in a table viewport of a visible portion of the browser-based main data table on the browser-based user interface, wherein said actions and changes in the table viewport of the visible portion of the browser-based main data table trigger regeneration of said each newly cloned frozen region, wherein said control and coordination mechanism, said cloning and sizing process, said element insertion and positioning process, and wherein said responsiveness process is initiated by a call to an application that modifies a display of the browser-based main data table on a browser-based user interface at a client-side.

15. The computer program product of claim 14, wherein the method further comprises:
providing parameters for invoking the control and coordination mechanism, wherein the parameters include the browser-based main data table, the table viewport, and the regions of the browser-based main data table to be frozen.

16. The computer program product of claim 14, wherein the method further comprises:
invoking the responsiveness process to detect scrolling and window resizing of the browser-based main data table.

17. The computer program product of claim 14, wherein the method further comprises:
modifying a visualization of the browser-based main data table without re-coding of the HyperText Markup Language (HTML) code that displays the browser-based main data table, wherein the visualization of the browser-based main data table is modified solely by initiating the call to the application that modifies the display of the browser-based main data table on the browser-based user interface at the client-side.

18. The computer program product of claim 14, wherein the method further comprises:
post-processing the browser-based main data table to dynamically generate the regions of the browser-based main data table to be frozen, wherein a selection of a quantity of regions and dimensions of regions for freezing within the browser-based main data table are decided upon and generated entirely at run-time on a client device that receives the browser-based main data table from a web server.

19. The computer program product of claim 14, wherein the method further comprises:
in response to cell sizes of cells in the browser-based main data table changing, adjusting a cell size of the frozen regions to match changed cell sizes of cells in the browser-based main data table.

20. A computer system comprising:
a hardware processor, a computer readable memory, and a computer readable storage medium;
first program instructions to invoke a control and coordination mechanism to oversee a modification of a visualization of a browser-based main data table;
second program instructions to invoke a cloning and sizing process, wherein the cloning and sizing process recursively traverses regions of the browser-based main data table to selectively clone and size regions of the browser-based main data table to be frozen, wherein a placement of a frozen portion of the browser-based main data table remains in a fixed position on a browser-based user interface while other cloned regions of the browser-based main data table are being scrolled, and wherein the regions of the browser-based main data table to be frozen are selectable from any area of the browser-based main data table;
third program instructions to invoke an element insertion and positioning process, wherein the element insertion and positioning process positions and makes visible each newly cloned frozen region, and wherein said each newly cloned frozen region overlays a region of the browser-based main data table; and
fourth program instructions to invoke a responsiveness process, wherein the responsiveness process uses event listeners and polling mechanisms to detect actions and changes in a table viewport of a visible portion of the browser-based main data table on the browser-based user interface, wherein said actions and changes in the table viewport of the visible portion of the browser-based main data table trigger regeneration of said each newly cloned frozen region, wherein said control and coordination mechanism, said cloning and sizing process, said element insertion and positioning process, and wherein said responsiveness process is initiated by a call to an application that modifies a display of the browser-based main data table on a browser-based user interface at a client-side; and wherein
the first, second, third, and fourth program instructions are stored on the computer readable storage medium and executed by the processor via the computer readable memory.

* * * * *